(12) United States Patent
Baba et al.

(10) Patent No.: US 7,463,156 B2
(45) Date of Patent: Dec. 9, 2008

(54) RFID TAG

(75) Inventors: Shunji Baba, Kawasaki (JP); Wei Jie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 11/584,608

(22) Filed: Oct. 23, 2006

(65) Prior Publication Data

US 2008/0001762 A1   Jan. 3, 2008

(30) Foreign Application Priority Data

Jun. 30, 2006   (JP)   ............................. 2006-181816

(51) Int. Cl.
*G08B 13/14* (2006.01)
(52) U.S. Cl. .................. 340/572.8; 340/572.1
(58) Field of Classification Search .............. 340/572.1, 340/572.8
See application file for complete search history.

(56) References Cited

U.S. PATENT DOCUMENTS

2002/0047781 A1 * 4/2002 Fallah ..................... 340/572.1

2006/0145867 A1 * 7/2006 Kikuchi et al. ........... 340/572.8

FOREIGN PATENT DOCUMENTS

| JP | 2000-200332 | 7/2000 |
|----|----|----|
| JP | 2000-311226 | 11/2000 |
| JP | 2001175823 A * | 6/2001 |
| JP | 2001-351082 | 12/2001 |

* cited by examiner

*Primary Examiner*—Jeff Hofsass
*Assistant Examiner*—Kerri L McNally
(74) *Attorney, Agent, or Firm*—Kratz, Quintos & Hanson, LLP

(57) ABSTRACT

A RFID tag includes an inlet in which an antenna for communication and a circuit chip performing radio communication with the antenna are electrically connected to each other. The RFID tag further includes a thermal storage section which encloses the inlet, which is made of a nonmetal, and which prevents thermal diffusion into the inlet and a thermal insulating section which encloses the thermal storage section, which prevents thermal conduction to the thermal storage section, and which has higher thermal diffusivity than thermal diffusivity of the thermal storage section and lower thermal conductivity than thermal conductivity of the thermal storage section.

2 Claims, 4 Drawing Sheets

RFID TAG

BACKGROUND OF THE INVENTION

1. Field of the Invention

The present invention relates to a RFID (Radio_Frequency_Identification) tag which exchanges information with an external device without contacting the device. Among persons skilled in the art of the field of the invention, the RFID tag used in the invention may also be called a "Wireless IC tag".

2. Description of the Related Art

Recent years there have been proposed various RFID tags which exchange information with an external device typified by a reader and writer using a radio wave without contacting the device (for example, see Japanese Patent Laid-Open Nos. 2000-311226, 2000-200332 and 2001-351082). One such RFID tag is provided with an antenna pattern for radio communication and a circuit chip both mounted on a base sheet made of a plastic or paper. Applications for such a RFID tag include discriminations of an article attached to the RFID tag through exchange of information of the article with an outside device.

The temperature resistance of a circuit chip mounted in such a RFID tag is guaranteed at best for a ten-year usage under an environment of 55° C. Under an environment of over such guaranteed temperature, there arises a problem that the reliability is deteriorated.

Typical of the RFID tag methods of protecting an object from a high temperature environment include thermal insulating methods such as vacuum insulation that the object to be protected is enclosed in a vacuum and hollow metal case to shield entrance of heat to the object, and covering the object with a thermal insulating material, for example a polystyrene foam.

In the vacuum insulation described above, however, an antenna pattern connected to a circuit chip is encased together with the circuit chip in a metal case, thereby causing radio communication with the antenna pattern to be obstructed by the metal case. In addition, because a polystyrene foam, a general thermal insulating material, has a low thermal capacity, the temperature inside the metal case may exceed the temperature guaranteed for a circuit chip when left in a high temperature for a long time.

The invention has been made in a view of the above circumstances and provides a RFID tag which is capable of tolerating a high temperature environment.

SUMMARY OF THE INVENTION

A RFID tag according to the invention includes an inlet in which an antenna for communication and a circuit chip performing radio communication with the antenna are electrically connected to each other. The RFID tag further includes a thermal storage section which encloses the inlet, which is made of a nonmetal, and which prevents thermal diffusion into the inlet and a thermal insulating section which encloses the thermal storage section, which prevents thermal conduction to the thermal storage section, and which has higher thermal diffusivity than thermal diffusivity of the thermal storage section and lower thermal conductivity than thermal conductivity of the thermal storage section.

According to the invention, the inlet having the circuit chip which is not resistant to a high temperature environment is double protected by the thermal storage section and the thermal insulating section. Environmental temperature, at first, is insulated by the thermal insulating section which has a relatively low thermal conductivity and relatively high thermal insulation. For this reason, heat conducted to the thermal storage section which encloses the inlet is suppressed. In addition, because the thermal storage section has a relatively low thermal diffusivity and relatively high thermal storage, heat is transmitted to the inlet so slowly that a temperature increase of the inlet itself can be suppressed for a long time. In other words, the RFID tag according to an aspect of the invention is capable of tolerating a high temperature environment. Further, in the RFID according to the invention, since both the thermal insulating section and the thermal storage section are made of a nonmetal, radio waves are not disturbed, resulting in good performance of radio communication by the inlet.

It is a preferable form that the RFID tag according to the invention includes a case which is made of a nonmetal, and which houses the thermal storage section enclosing the inlet, wherein the thermal insulating section covers a surface of the case.

According to the preferable form above, it is also possible to protect the inlet mechanically.

As described above, according to the invention, the RFID tag which is capable of tolerating a high temperature environment is obtained.

DETAILED DESCRIPTION OF THE INVENTION

An exemplary embodiment will be described with reference to the drawings.

Figure 1:
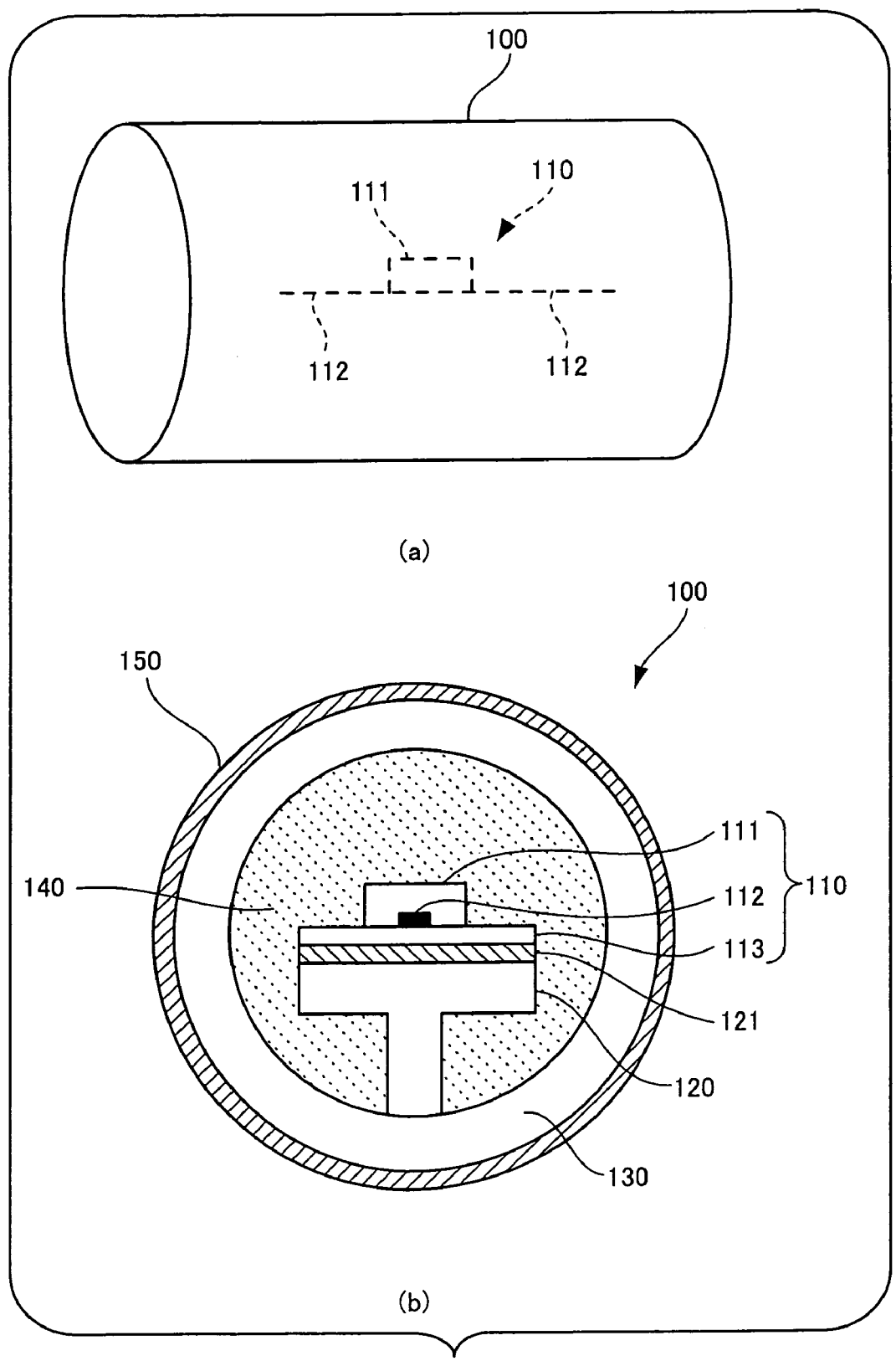
FIG. 1 is a diagram showing an embodiment of a RFID tag according to the invention.

FIG. 1 is a diagram showing an embodiment of a RFID tag according to the invention.

In Part (a) of FIG. 1 is shown an external view of a RFID 100 according to an embodiment of the invention. In Part (b) of FIG. 1 is shown a sectioned view of the RFID tag 100 when it is cut in a plane perpendicular to the center axis thereof.

The RFID tag 100 shown in FIG. 1 includes an inlet 110 in which an antenna pattern 112 forming an antenna for radio communication and formed on a base 113 is electrically connected to a circuit chip 111 which performs radio communication with the antenna, a supporting platform 120 made of temperature-resistant plastic to which the inlet 110 is fixed with an adhesive agent 121, a case 130 with a cylindrical shape and made of temperature-resistant plastic on part of which the supporting platform 120 is fixed, a thermal storage section 140 enclosed with a thermal storage material, which will be described later in detail, in the case 130 such that the thermal storage material encloses the inlet 110, and a thermal insulating section 150 applied with a thermal insulating coating material, which will be described later in detail, such that the thermal insulating coating material covers the outer surface of the case. The inlet 110, the case 130, the thermal storage section 140 and the thermal insulating section 150 correspond to an example of the inlet, the case, the thermal storage section and the thermal insulating section of the invention respectively. The circuit chip 111 and the antenna pattern 112 correspond to an example of the circuit chip and the antenna according of the invention respectively.

In the embodiment, the inlet 110 having the circuit chip 111 which is not resistant to a high temperature environment is protected by the thermal storage section 140 and the thermal insulating section 150. In the embodiment, the thermal storage section 140 is formed with silicon resin, and the thermal insulating section 150 is formed with SISTACOAT (a registered trademark) which is an example of heat resistant coating materials. SISTACOAT is a resin coating material containing minute hollow ceramic beads, and has high thermal insulation with about 0.03/m·c of thermal conductivity. The thermal insulating section 150 formed with SISTACOAT prevents entrance of heat from the outside into the inside of the RFID tag 100. In addition, the silicon resin forming the thermal storage section 140 has high thermal storage with about $5 \times 10^{-8}$ m$^2$/s of thermal diffusivity. As a result, the thermal conduction speed at the thermal storage section 140 is suppressed so low that heat is prevented from being conducted to the inlet 110 located in the center of the RFID tag 100. Thus, in the RFID tag 100 of the embodiment, with both the thermal insulation effect by the thermal insulating section 150 and the thermal storage effect by the thermal storage section 140, the temperature around the inlet 110 located inside the RFID tag 100 is prevented from increasing.

Suppressing inside temperature increase by the thermal insulation effect and the thermal storage effect will be described in detail with a simulation using the following models.

Figure 2:
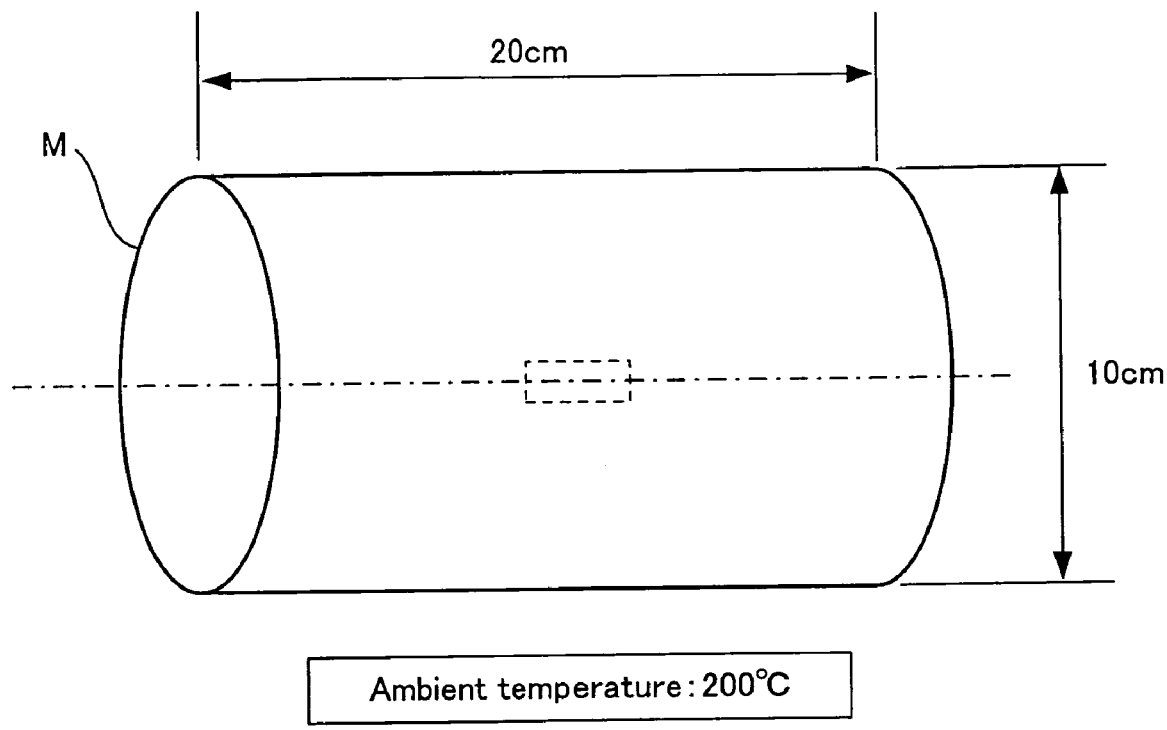
FIG. 2 is a diagram showing outline dimensions of models used in a simulation.

FIG. 2 is a diagram showing outline dimensions of the models used in the simulation.

In the simulation are used three kinds of models, which are a cylindrical thermal insulating material with a diameter of about 10 cm and a length of about 20 cm, a cylindrical thermal storage material, and the cylindrical thermal storage material coated with an insulating material of about 1 mm thickness. In FIG. 2 is a conceptual illustration showing a model M of only an external form. The temperature in the simulation is set to 200° C.

Physical properties of the thermal insulating materials and the thermal storage materials used in the simulation are shown in Table 1 below.

TABLE 1

| Filling material | Density (kg/m$^3$) | Thermal conductivity (W/m · c) | Thermal diffusivity (m$^2$/s) |
|---|---|---|---|
| Polystyrene foam | 36 | 0.033 | $5 \times 10^{-7}$ |
| Silicon resin | 2200 | 0.16 | $5 \times 10^{-8}$ |

The simulation described below is performed on the assuming that as the thermal insulating material, SISTACOAT described above is substituted with a polystyrene foam which has a thermal conduction ratio similar to that of SISTACOAT and is easily handled in calculation.

The simulation is performed in solving the equation below for determining the difference in temperature between the center of each model and its ambience:

$$(\delta\theta/\delta\tau) = k(\delta^2\theta/\delta r^2)$$

$$k = \lambda/(Cp \cdot \rho)$$

where: "θ" is the difference in temperature between the center of each model and its ambience, "τ" is the time, "r" is the distance of a radius in the direction from the cylindrical surface to the center axis of each model, "k" is the thermal diffusivity, "λ" indicates thermal conductivity, "Cp" is the specific heat, and "ρ" is the density. The equation is solved based on the initial condition represented by: θ=200° C.−25° C.=175° C. when τ=0.

Figure 3:
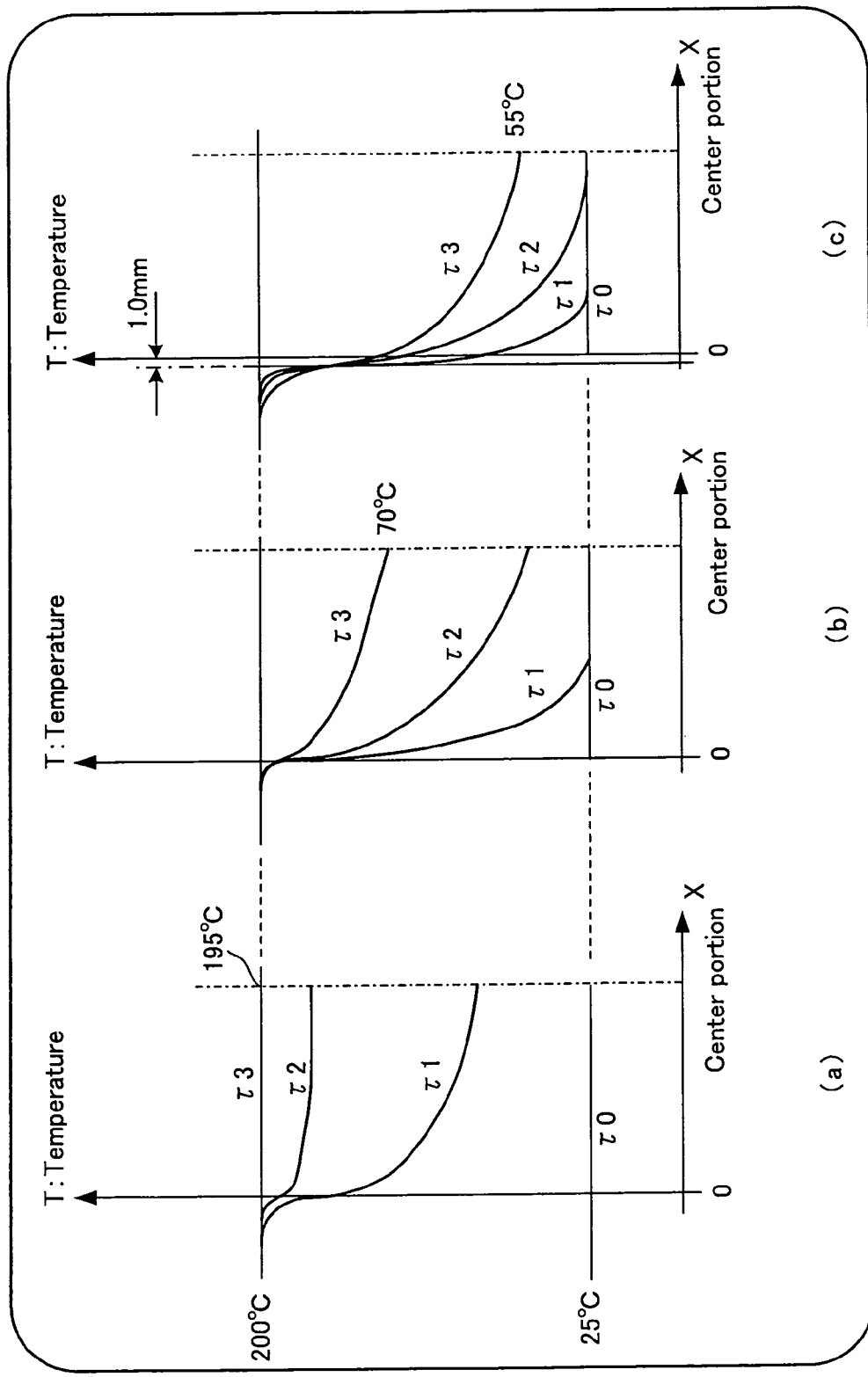
FIG. 3 is a graph showing simulation results.

FIG. 3 is a graph showing a simulation result.

In Part (a) of FIG. 3 is shown a thermal distribution of the inside the cylindrical thermal insulating material when the material is stable at 25° C. at the beginning is left in the ambient temperature of 200° C. In Part (b) of FIG. 3 is shown the thermal distribution when the cylindrical thermal storage material is left in the ambient temperature of 200° C. In Part (c) of FIG. 3 is shown the internal thermal distribution when the cylindrical thermal storage material coated with the insulating material is left in the ambient temperature of 200° C. In each graph, in a horizontal axis are shown positions X in a direction to the center when the surface of the cylinder is set to "0", and in a logarithmic vertical axis are shown temperatures T logarithmically. Three lines of each graph show a thermal distribution respectively at τ1 (60 seconds), τ2 (300 seconds) and τ3 (3600 seconds) that represent the respective elapsed time.

An shown in Table 1, the thermal insulating material (polystyrene foam) has the higher thermal diffusivity of $5 \times 10^{-7}$ m$^2$/s than the thermal storage material (silicon resin) does, and allows heat to be conducted quickly to its inside. As a result, as shown in Part (a) of FIG. 3, in the model formed with only the thermal insulating material, even though ambient temperature is insulated once near the surface, heat is transmitted to the inside so fast as to raise temperature of the insulating material itself. As the line representing the thermal distribution at τ3 (3600 seconds) shows, after 3600 seconds, temperature of the center potion where the inlet 110 is placed in the RFID tag 100 shown in FIG. 1 reaches 195° C., exceeding far beyond 55° C. at which a general circuit chip is guaranteed to work for ten years. In Part (a) of FIG. 3, 195° C. and 200° C. are viewed at almost same positions since temperature is expressed logarithmically.

In addition, as shown in FIG. 1, the thermal storage material (a silicon resin) has the lower thermal diffusivity of $5 \times 10^{-8}$ m$^2$/s than the thermal insulating material (a polystyrene foam) does, and causes heat to be conducted slowly to its inside. As a result, as shown in Part (b) of FIG. 3, even after 3600 seconds, in the model formed only with the thermal storage material, thermal increase is substantially suppressed such that the temperature in the center portion is about 70° C. as the line representing the thermal distribution at τ3 (3600 seconds) shows, comparing with the model formed only with the thermal insulating material as in part (a) of FIG. 3. However, the thermal storage material has a larger thermal conductivity of 0.16(W/m·c) as shown in FIG. 1 than the thermal insulating material does, and allows the heat from the outside to enter into the inside through the surface. As a result, alone can not suppress temperature increase in the center to no more than the guaranteed temperature described above (55° C.).

On the other hand, with the model that the surface of the thermal storage material is coated with the thermal insulating material of 1 mm thickness, thermal conductivity of the surface which directly contacts the environmental temperature is as low as 0.033, and thermal diffusivity of the inside is as low as $5 \times 10^{-8}$ m$^2$/s. Therefore, heat from the outside is prevented to enter through the surface by the thermal insulating material, and furthermore the heat entrance into the inside is also prevented to progress into the case by the thermal storage material. As a result, as shown by the line showing the temperature distribution at τ3 (3600 seconds) in Part (c) of FIG. 3, even after 3600 seconds, temperature of the core is suppressed to no more than the guaranteed temperature (55° C.).

From the simulation described above, in the RFID tag 100 shown in FIG. 1, temperature increase around the inlet 110 is suppressed by the thermal insulating effect of the thermal insulating section 150 and the thermal storage effect of the thermal storage section 140.

In addition, in the model that the surface of the thermal storage material is coated with the thermal insulating material, when simulations are performed with various thermal conductivities and thermal diffusivities for the both thermal insulating material and thermal storage material, desirable conditions for obtaining good effects on suppressing temperature of the center as described above are obtained as follows.

In other words, if thermal conductivity and thermal diffusivity of the thermal insulating material are $\lambda 1$ and k1 respectively, and thermal conductivity and thermal diffusivity of the thermal storage material are $\lambda 2$ and k2 respectively, it is desirable to fulfill the conditions: $\lambda 1 \ll \lambda 2$ and k1>k2. Concretely, it is desirable to fulfill the conditions: $\lambda 1 < 0.01$ W/m·c, $\lambda 1 \ll \lambda 2 < 0.01$ W/m·c, $k1 < 5 \times 10^{-7}$ m$^2$/s, $k2 < 5 \times 10^{-8}$ m$^2$/s.

Next, a manufacturing procedure of the RFID tag 100 will be described.

Figure 4:
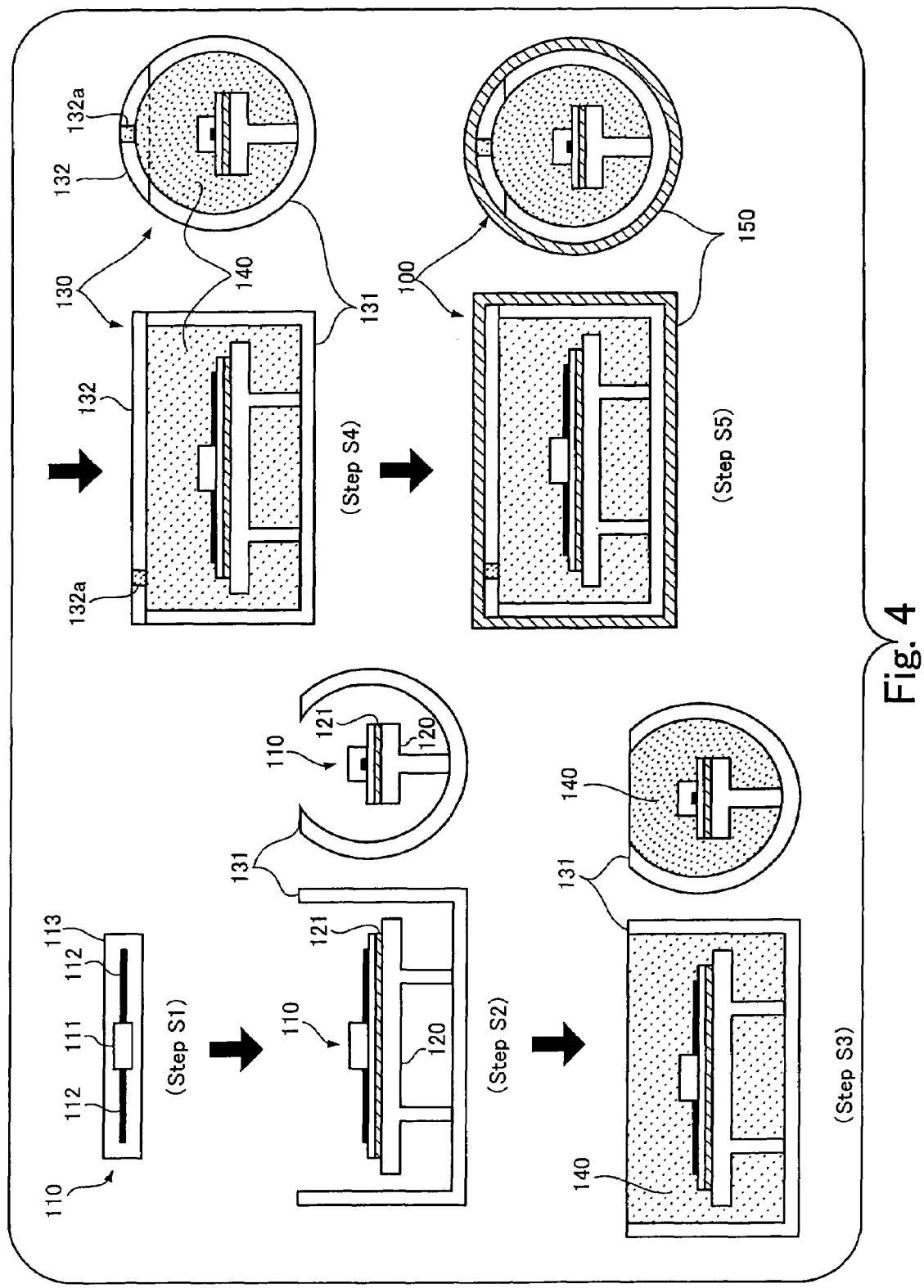
FIG. 4 is a diagram showing a manufacturing procedure of the RFID tag 100 shown in FIG. 1.

FIG. 4 is a diagram showing a manufacturing procedure of the RFID tag 100 shown in FIG. 1.

At first is prepared the inlet 110, also shown in FIG. 1, in which the antenna pattern 112 forming an antenna for communication on the base 113 is electrically connected to a circuit chip 111 which performs radio communication with the antenna (Step S1). In FIG. 4 is shown a top view of the inlet 110.

Next, the inlet 110 is fixed with the adhesive agent 121 to the supporting platform 120 which is fixed to a cylindrical case main body 131 whose circumference surface is partly removed there from (Step S2). In FIG. 4 is shows a sectional views of the inlet 110 glued to the supporting platform 120 viewed when the cylindrical shape described is cut in a plane parallel to the central axis and when it is cut in a plane perpendicular to the central axis. Similarly to Step S2, a state of each subsequent step will be shown in two cross sections.

After the inlet 110 is glued, the silicon resin is applied from the opening where the circumference is partly removed from the case main body 131 to form the thermal storage section 140 (Step S3).

Next, a lid 132 is fixed to the opening where the cylindrical part is removed from the case main body 131. When the lid 132 is fixed, the inside under the lid 132 is empty. However, as an opening 132a is made for filling the lid 132 with the silicon resin, the empty space under the lid 132 is filled with the silicon resin from the opening 132a in Step S4. When Step S4 is finished, the case 130 and the thermal insulating section 140 are completed.

Finally, the insulating material, SISTACOAT is coated in 1 mm thickness on the outer surface of the case 130 to form the insulating section 150 and then the RFID tag 100 is completed (Step S5).

Through the steps described is manufactured the RFID tag 100 in which the inlet 110 is enclosed in the thermal storage section 130, the surface of which is coated with the thermal insulating section 150, and which is capable of tolerating a high temperature environment.

In the description above, the RFID tag 100 which has the case 130 made of the thermal resistant plastic is exemplified as an embodiment of the RFID tag according to the invention. However, the invention is not so limited, and the RFID tag according to the invention may have, for example, such an inlet that is molded with a thermal storage material and the outer surface of the thermal storage material is coated with a thermal insulating material.

In addition, in the description above, as an example of the thermal insulating section according to the invention, the thermal insulating section 150 formed with the thermal insulating coating material, SISTACOAT is exemplified. However, the invention is not so limited, and the thermal insulating section according to the invention, for example, may be made of a different material as far as the material has the better thermal insulating performance than that of the thermal storage section.

Further, in the description above, as an example of the thermal storage section according to the invention, the thermal storage section 140 formed with the silicon resin is exemplified. However, the invention is not so limited, and the thermal storage section according to the invention may be, for example, formed with a paper which has the thermal diffusivity of $5 \times 10^{-8}$ m$^2$/s or a natural rubber which has a thermal diffusivity of $5 \times 10^{-8}$ m$^2$/s, and the like.

Furthermore, in the description above, as an example of the case according to the invention, the case 130 made of the heat resistant plastic is exemplified. As heat resistant plastics, more specifically, polyphenylene sulfide (PPS), polyether sulfide (PES), polyamide imide (PAI), polyether etherketone (PEEK) and the like are exemplified.

What is claimed is:

1. A RFID tag comprising:
   an inlet in which an antenna for communication and a circuit chip performing radio communication with the antenna are electrically connected to each other;
   a thermal storage section that encloses the inlet, that is made of a nonmetal, and that prevents thermal diffusion into the inlet; and
   a thermal insulating section that encloses the thermal storage section, that prevents thermal conduction to the thermal storage section, and that has higher thermal diffusivity than thermal diffusivity of the thermal storage section and lower thermal conductivity than thermal conductivity of the thermal storage section.

2. The RFID tag according to claim 1, further comprising:
   a case that is made of a nonmetal, and that houses the thermal storage section enclosing the inlet,
   wherein the thermal insulating section covers a surface of the case.

* * * * *